United States Patent
Onimaru et al.

[11] Patent Number: 5,842,952
[45] Date of Patent: Dec. 1, 1998

[54] CONTROL DEVICE FOR RELEASING AN EXHAUST BRAKE AND ENGAGING A LOCKUP CLUTCH SIMULTANEOUSLY DURING A DOWNSHIFT

[75] Inventors: Yoshiyuki Onimaru; Masato Shimei, both of Nagoya; Masayuki Tomita, Chiryu; Kokichi Kato, Nagoya, all of Japan

[73] Assignee: Aisin Seiki Kabushiki Kaisha, Kariya, Japan

[21] Appl. No.: 741,514

[22] Filed: Oct. 31, 1996

[30] Foreign Application Priority Data

Oct. 31, 1995 [JP] Japan .................................. 7-283878

[51] Int. Cl.[6] ...................................................... F16H 5/40
[52] U.S. Cl. ........................... 477/174; 477/110; 192/4 A
[58] Field of Search ................................... 477/110, 174, 477/175; 192/4 A, 201, 204, 205

[56] References Cited

U.S. PATENT DOCUMENTS

| | | | |
|---|---|---|---|
| 4,961,484 | 10/1990 | Kato et al. | 192/4 A X |
| 5,086,889 | 2/1992 | Nobumoto et al. | 477/174 X |
| 5,088,348 | 2/1992 | Hiramuki | 477/110 X |
| 5,282,399 | 2/1994 | Sano et al. | 477/110 X |
| 5,362,285 | 11/1994 | Sano et al. | 477/92 |
| 5,460,584 | 10/1995 | Kusaka et al. | 477/174 X |

*Primary Examiner*—Khoi Q. Ta
*Attorney, Agent, or Firm*—Burns, Doane, Swecker & Mathis, LLP

[57] ABSTRACT

A control device of an automatic transmission comprises a controller which detects accel off caused by the release of accelerating owing to the accel stamping in which lock-up clutch is released, and which proceeds command which releases the operation thereof or releases temporally the operation thereof to an exhaust brake device when it is decided that the exhaust brake is in operation. When accel off is suddenly conducted at the time of accelerating in which the lock-up clutch is not engaged the phenomenon in which the speed ratio at the torque converter is prevented from occurring by releasing the exhaust brake by the controller. Accordingly, the engaging operation of the lock-up clutch is conducted easily and it is possible to let the engine brake work. When the down shift of the automatic transmission or accel off is conducted a the time of using the exhaust brake, it is possible to conduct the engagement, of the lock-up clutch easily and let the engine brake work effectively.

12 Claims, 4 Drawing Sheets

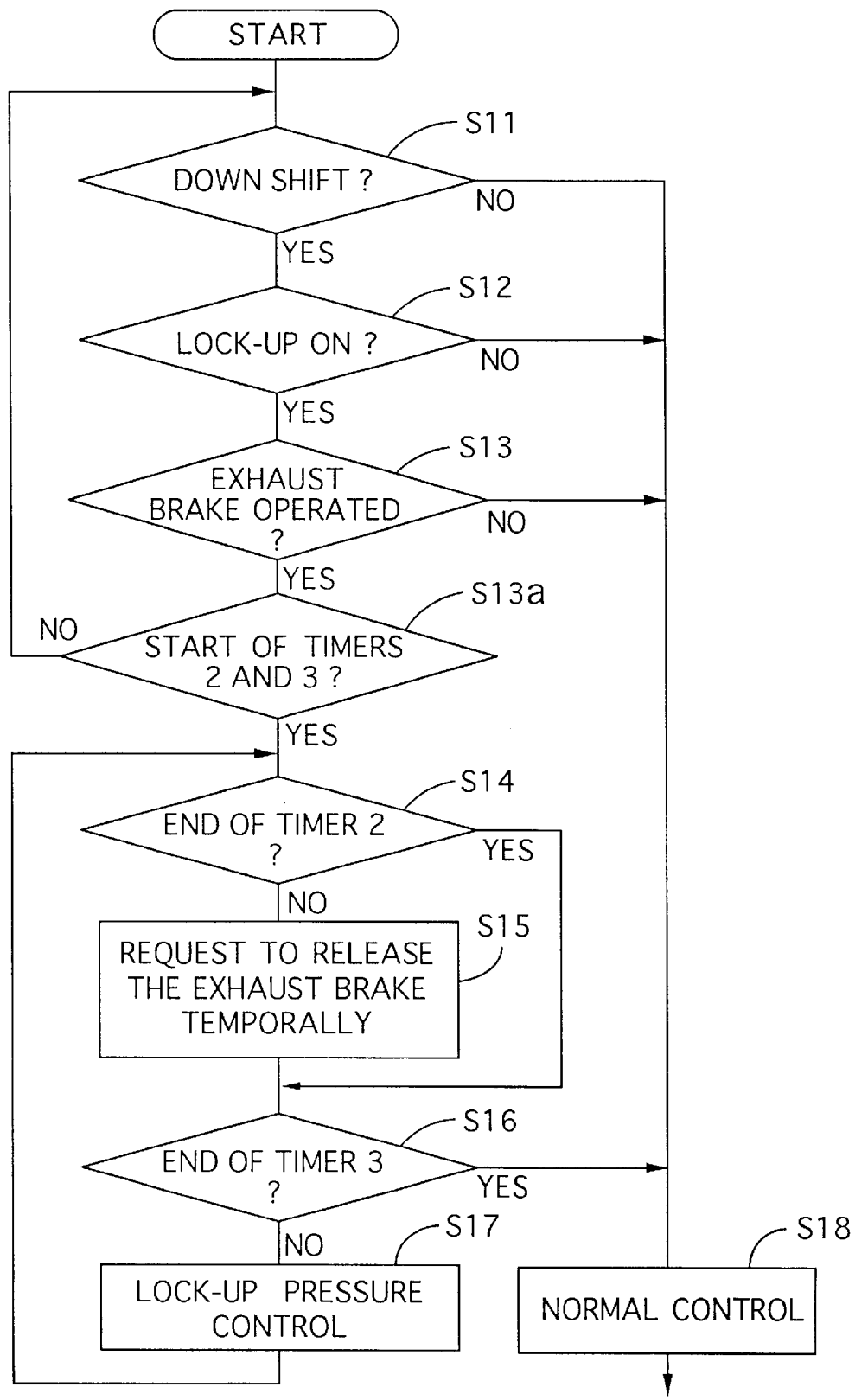

CONTROL DEVICE FOR RELEASING AN EXHAUST BRAKE AND ENGAGING A LOCKUP CLUTCH SIMULTANEOUSLY DURING A DOWNSHIFT

BACKGROUND OF THE INVENTION

1. Field of the Invention

The present invention relates to a control device of an automatic transmission which is provided with a lock-up clutch and which is improved so that the engine brake effectively functions at the time of employing an exhaust brake.

2. Description of the Prior Art

By the rotation of the pump which is directly connected to the output axis of the engine, a torque converter converts the power from the engine to the kinetic energy of fluid. And this flow rotates a turbine so that the power is transmitted to the output axis. Accordingly, there arises the power loss caused by slip in the torque converter. In order to prevent this loss, of an automatic transmission vehicle (A/T vehicle), there is provided a lock-up clutch which mechanically connects the input side and the output side of the torque converter.

The lock-up clutch is released at the time of running at relatively low-speed. For example, at the time of second-speed, third-speed or four speed running, this lock-up clutch is engaged when the speed exceeds more than the predetermined speed in response to the certain throttle opening, or it is engaged in accordance to the running condition (gear position, speed and such). Therefore, it is temporally released so as to avoid the shock caused by the direct connection at the time of shift transmission.

Based on the automatic transmission provided with the above-mentioned lock-up clutch, there arises the following disadvantages caused by the release of the lock-up clutch temporally at the time of shift transmission, as mentioned above.

Namely, at the time of running, when the exhaust brake is operated, as the brake effect is improved more, manually operated down shift or automatically operated down shift (in the case of the automatic down shift, shift operation is conducted by the transmission line which is predetermined before) is conducted. And then, the lock-up clutch is temporally released. So, in order to obtain the engine brake which has been effective after the end of shift operation, even the lock-up command signal is actually output so as to engage the lock-up clutch, the engine speed is decreased in the lock-up clutch open period. Accordingly, in the torque converter, speed ratio (the ratio between a turbine runner and a pump impeller in the state in which rotational frequency of a turbine is more than rotational frequency of an impeller) is increased and it is hard to engage the lock-up clutch. Therefore, the effective engine brake is hard to be obtained against the intention of the driver.

Furthermore, in the state of accel-on (accelerating) in which the lock-up clutch is not engaged, when the driver suddenly put accel off (the stamping of the accel is released) in the stationary state (accel step angle is constant), based on the decision of the controller, even entering the lock-up operation range, as the exhaust brake is acted, engine speed at the time of gear shifting is greatly deceased so that speed ratio in the torque converter is increased. Accordingly, as the same in the case of the above-mentioned down shift time, it is hard to engage the lock-up clutch and the effective engine brake is not obtained.

SUMMARY OF THE INVENTION

The present invention has been developed in view of the above-mentioned problems found in the prior art. The following is an object of the present invention: when the down shift of the automatic transmission or accel off is conducted at the time of using the exhaust brake, by releasing the exhaust brake is conducted or releasing thereof is conducted temporally, it becomes easy to engage the lock-up clutch so that at the time of using the exhaust brake, the effect of engine braking after the end of gear shifting; is securely worked.

In order to achieve this object, there is provided an improved control device of an automatic transmission having a lock-up clutch which directly connects the imput side and the output side of a troque converter. This control device comprises: (a) an exhaust brake release command means which detects accel off caused by the release of accelerating owing to the accel stamping in which lock-up clutch is released; and which proceeds command which releases the operation thereof or releases temporally the operation thereof to an exhaust brake device when it is decided that the exhaust brake is in operation; (b)a lock-up clutch driving means which engages said lock-up clutch after the operation of said exhaust brake device is released by said exhaust brake release command means.

Further, in order to achieve this object, there is provided an improved control device of an automatic transmission having a lock-up clutch which directly connects the input side and the output side of a torque converter. This control device comprises: (a) an exhaust brake release command means which decides that; the shift position is down shifted; and which proceeds command which releases the operation thereof or releases temporally the operation thereof to an exhaust brake device when it is decided that the exhaust brake is in operation; (b)a lock-up clutch driving means which engages said lock-up clutch after the operation of said exhaust brake device is released by said exhaust brake release command means.

As mentioned above, accel off, caused by the release of accelerating owing the the accel stamping in which lock-up clutch is released, is detected; releases the operation of the exhaust brake or releases temporally the operation thereof when it is decided that the exhaust brake is in operation; and meanwhile, the lock-up clutch is engaged. Accordingly, the engaging operation of the lock-up clutch is conducted easily and it is possible to let the engine brake work.

at the time of shift down when exhaust brake is operated in the time of engaging of the lock-up clutch, the operation of the exhaust brake is released or temporally released; and in the meantime, the lock-up clutch is engaged. Accordingly, the engaging operation of the lock-up clutch is conducted easily and it is possible to let the engine brake work.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 5 is a flow chart showing the operation of the Second Preferred Embodiment according to the present invention.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

Figure 1:
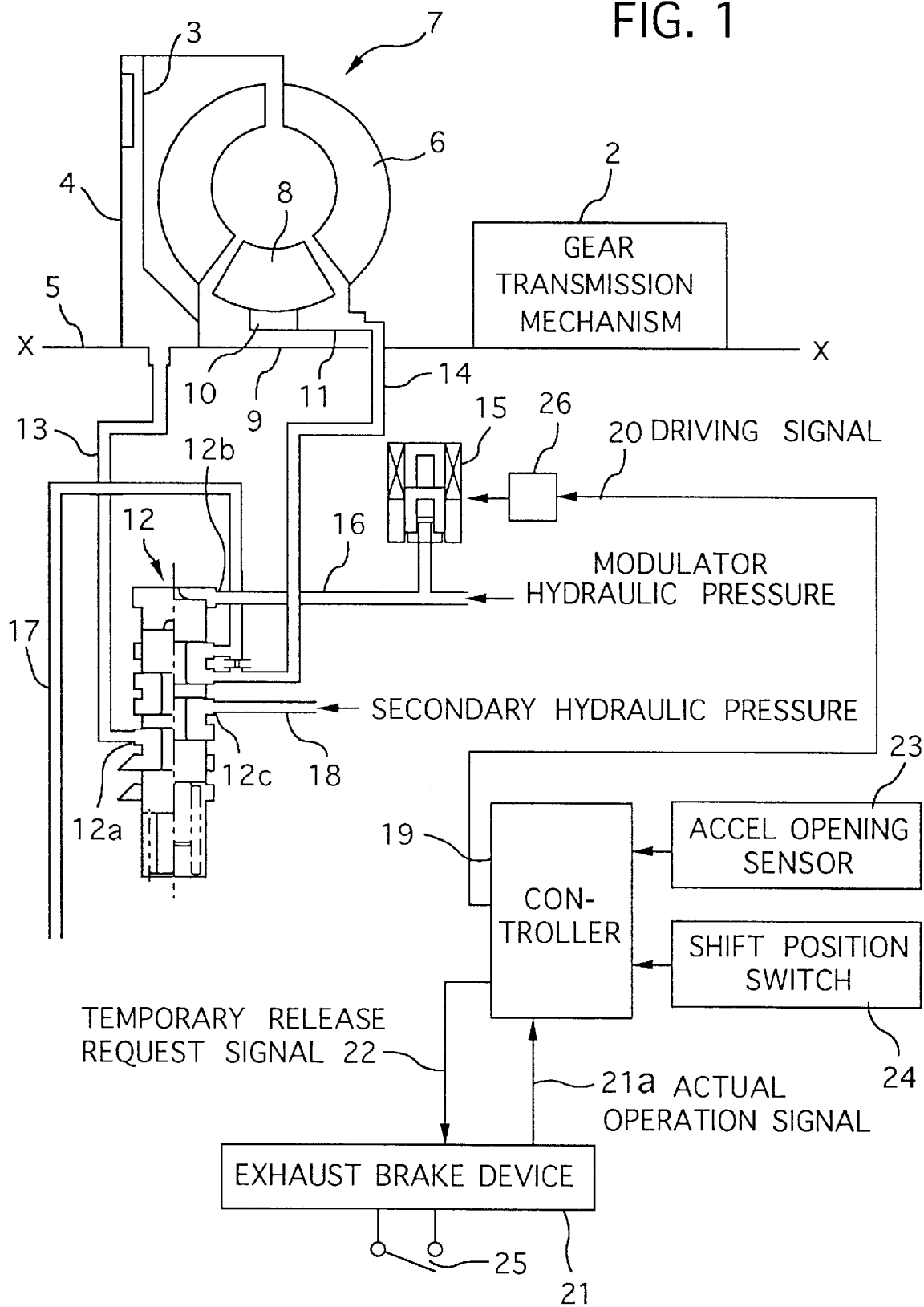
FIG. 1 is a schematic illustration of the control device of an automatic transmission according to the present invention.

As shown in FIG. 1, in the control device of an automatic transmission concerning a preferred embodiment of the present invention, the automatic transmission is constructed as follows: the power of the engine (not shown in FIG. 1) is transmitted to the gear transmission mechanism 2 through a torque converter 1; and a lock-up clutch 3, which directly connects the input side and the output side, is contained in the torque converter 1. The torque converter 1 has the following structure: an input axis 5 is connected to a front cover 4; the torque converter is rotatably driven around the rotational axis X—X; while a turbine runner 7 is provided so as to face a pump impeller 6 which is provided integrally to said front cover 4; and between thereof, a stator 8 is provided so as to connect an output axis 9; and at the same time, the stator 8 is supported at a fixing support portion 11 through a clutch 10 in one direction.

In this way, at said lock-up clutch 3, hydraulic oil at one side is supplied from a pipe line 13 which is connected to an output port 12a of a lock-up control valve 12; and hydraulic oil at the other side is supplied through oil cooler side output pipe line 14 (the pipe line 14, which will be mentioned later, is connected to an oil cooler side output pipe line 17 through the look-up control valve 12) of the torque converter 1.

One of the input ports, 12b of said lock-up control valve 12 is constructed so that the hydraulic oil which keeps the modulator hydraulic pressure can be supplied from the pipe line 16 through a lock-up solenoid 15. And at the same time at the other input port 12c, the hydraulic oil which keeps the secondary oil pressure from the sides of the primary regulator valve and the secondary regulator valve (not shown in FIG. 1) is supplied through a pipe line 18.

On the other hand, the control device of the automatic transmission which embodies each means of the present invention is mainly composed of an electric control device (called a controller hereinafter) 19 by a microcomputer and so on. This controller 19 supplies and receives various output signals for controlling the transmission. In this case, the controller 19 sends a solenoid driving signal 20 to the above-mentioned lock-up solenoid 15; and a temporary release request signal 22 to an exhaust brake device 21, and the controller receives: a detecting signal of accel opening sensor 23 which detects the step angle of the accel pedal; a detecting signal of a shift position switch 24 which detects the position of a manual valve or a shift lever; and an actual operation signal 21a which shows the actual operation condition of the above-mentioned exhaust brake device 21. Here, the exhaust brake device 21 comprises a exhaust brake switch 25 which is manually operated and it makes possible that a valve in the exhaust pipe is operated by the above-mentioned exhaust brake switch 25. Furthermore, the solenoid driving signal 20 is transmitted to the lock-up solenoid 15 through a driver 26.

Figure 2:
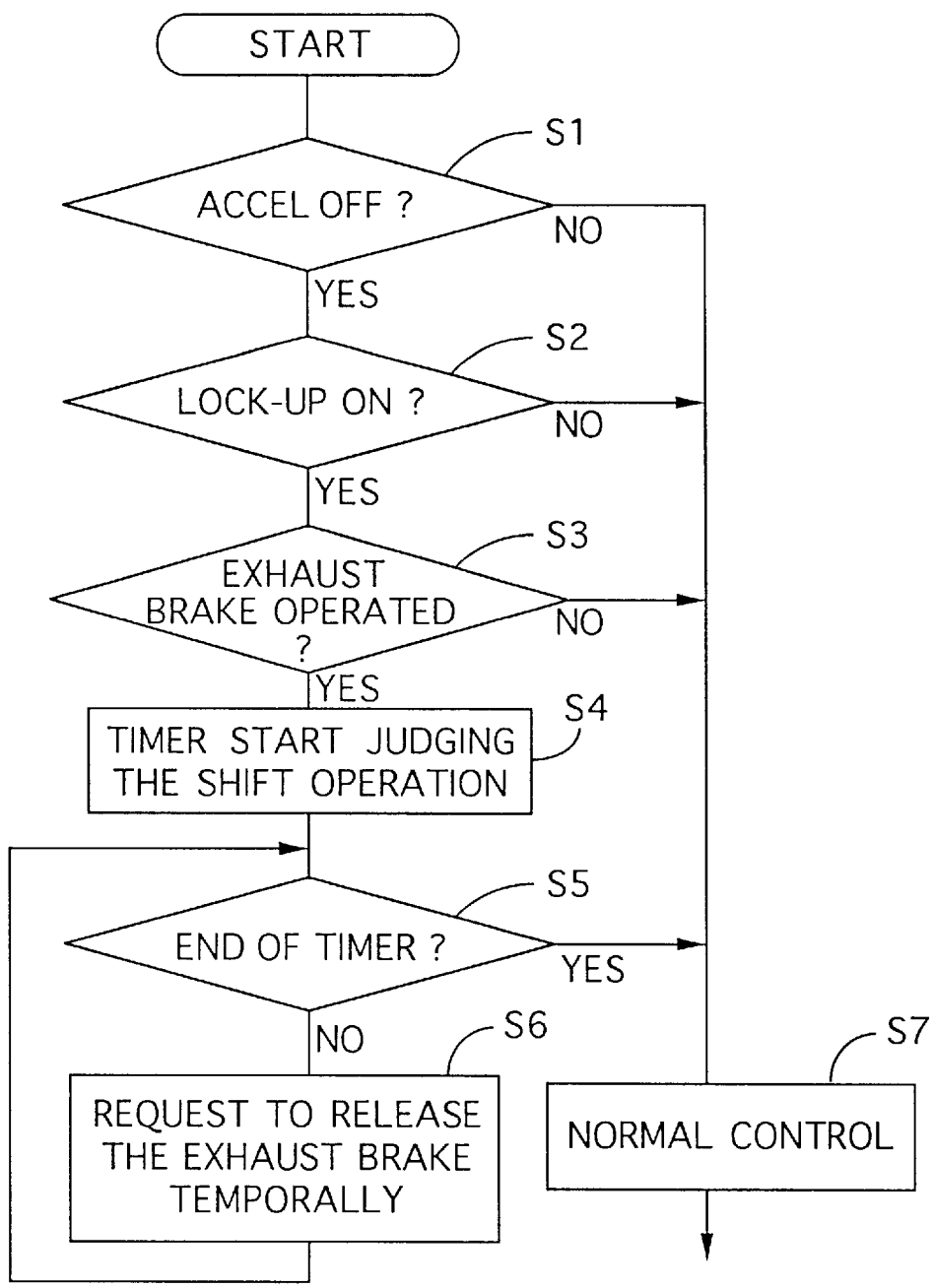
FIG. 2 is a flow chart showing the operation of a First Preferred Embodiment according to the present invention.

The control device of the automatic transmission constructed as mentioned above, operates as the First Preferred Embodiment shown in the flow chart of FIG. 2. In the state of relatively low speed at the time of stamping accel in which the accel opening shown in FIG. 3 (A) reaches the predetermined value (at; this time, the lock-up clutch 3 is considered to be in the release state as shown in FIG. 3(C)), if the accel is released at the time of $T_{-0}$, the decision of S1 [accel off?] becomes "YES" so that the engagement of the lock-up clutch 3 is required in order to obtain the effective engine brake, therefore the controller 19 transmits the driving signal 20 to the lock-up solenoid 15 judging the decision of S2 [lock up on?] as "YES" (lock-up clutch engaging region) and proceeds to S3.

In S3 [exhaust brake operated?], depending on the condition of the switch 25 of the exhaust brake device 21, it is decided whether the operations of exhaust brake ON is conducted or not. If it is decided "YES" in S3, shift decision time $T_0$ as shown in FIG. 3 is decided (S4) so that the self-contained timer (timer 1, here) is started. Timer 1, as shown in FIG. 3 (D), decides the period in which the brake operation is delayed. This period is decided by S5 [end of timer?], and during the time from start (S) to time up (E) (refer to FIG. 3 (D)), S6 [request to release the exhaust brake temporally) is conducted.

Figure 3:
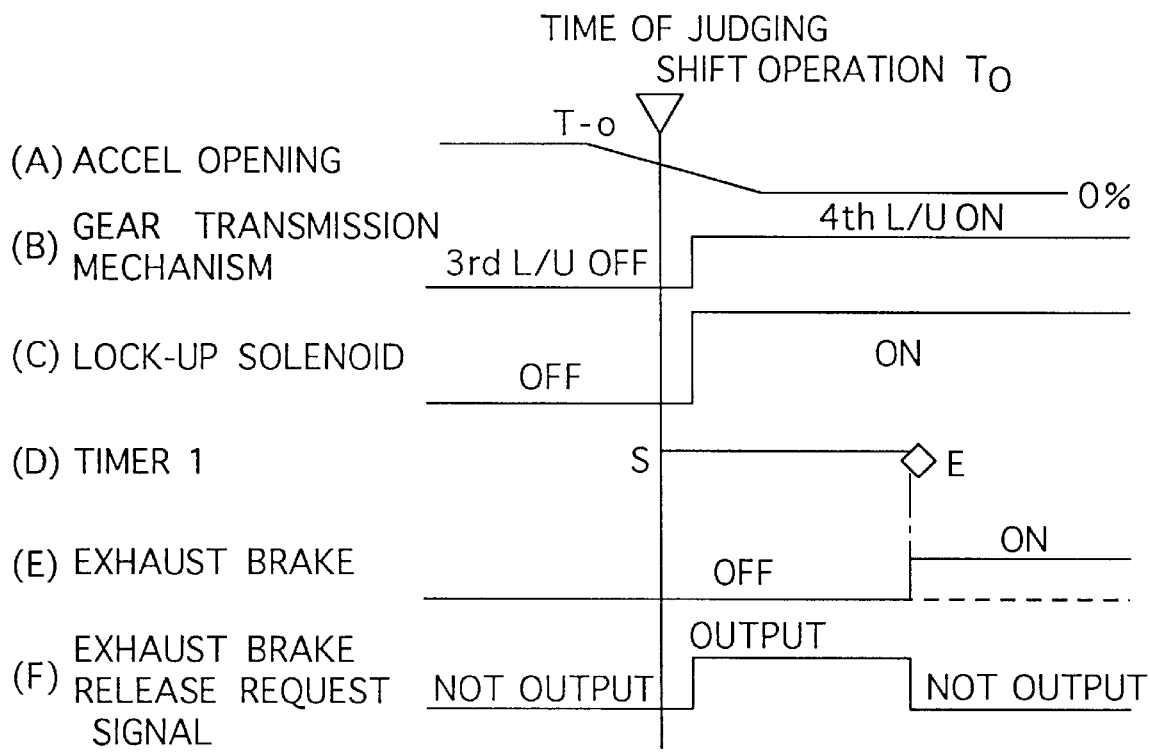
FIG. 3 is a time chart showing the operation of the First Preferred Embodiment according to the present invention: (A) represents accel opening; (B) the operation of gear transmission mechanism; (C) the driving signal of the lock-up solenoid; (D) the operation of timer 1; (E) the operation of the exhaust brake; (F) exhaust brake release request signal respectively.

In the above-mentioned S6, as shown in FIG. 3 (F), after the start (S) of the timer 1, the temporary release request signal 22 is transmitted to the exhaust brake device 21; and as shown in FIG. 3 (E), disregarding the condition of the switch 25, the exhaust brake is set to be OFF. Accordingly, while the exhaust brake is in the state of OFF, as shown in FIG. 3 (B), the lock-up clutch 3 is actually engaged (ON). As shown in FIG. 3 (B), this control may be accompanied with the shift operation from three-speed shift to four-speed shift of the gear transmission mechanism 2.

In the actual operation process of the above-mentioned accel off (S1), lock up on (S2) or exhaust brake operated (S3), if the accelerator is not off, or when it is decided that the engagement of lock-up clutch is not required even if accel is off, or the exhaust brake is not operated when accel is off, the controller 19 conducts S7 (normal control). Also, during the operation of timer 1, S7 is conducted.

In this way, in the First Preferred Embodiment, in the state in which the lock--up clutch 3 is not engaged or in the case when the driver suddenly sets the accel off in the normal condition, if it is decided in the engaging region of the lock-up clutch 3 by the controller 19; the phenomena in which the speed ratio at the torque converter 1 is increased as caused by the exhaust brake is prevented from occurring by conducting temporary release; so that the engaging operation of the lock-up clutch 3 is easily conducted, and therefore, it is possible to let the engine brake work securely.

However, in the above-mentioned First Preferred Embodiment, after the exhaust brake is temporally released and the lock-up clutch 3 is engaged, it is effective to operate the exhaust brake again; but, without operating the exhaust brake, only by the engine brake to which the lock-up clutch is engaged, speed reducing affect which is intended by the driver can be obtained; therefore, it is not necessary to define the device in which the exhaust brake is temporally released and it may be possible to maintain the state in which the exhaust brake is released.

Second Preferred Embodiment

Next, it may be possible to operate the following Second Preferred Embodiment, in the control device in the automatic transmission shown in FIG. 1.

Figure 4:
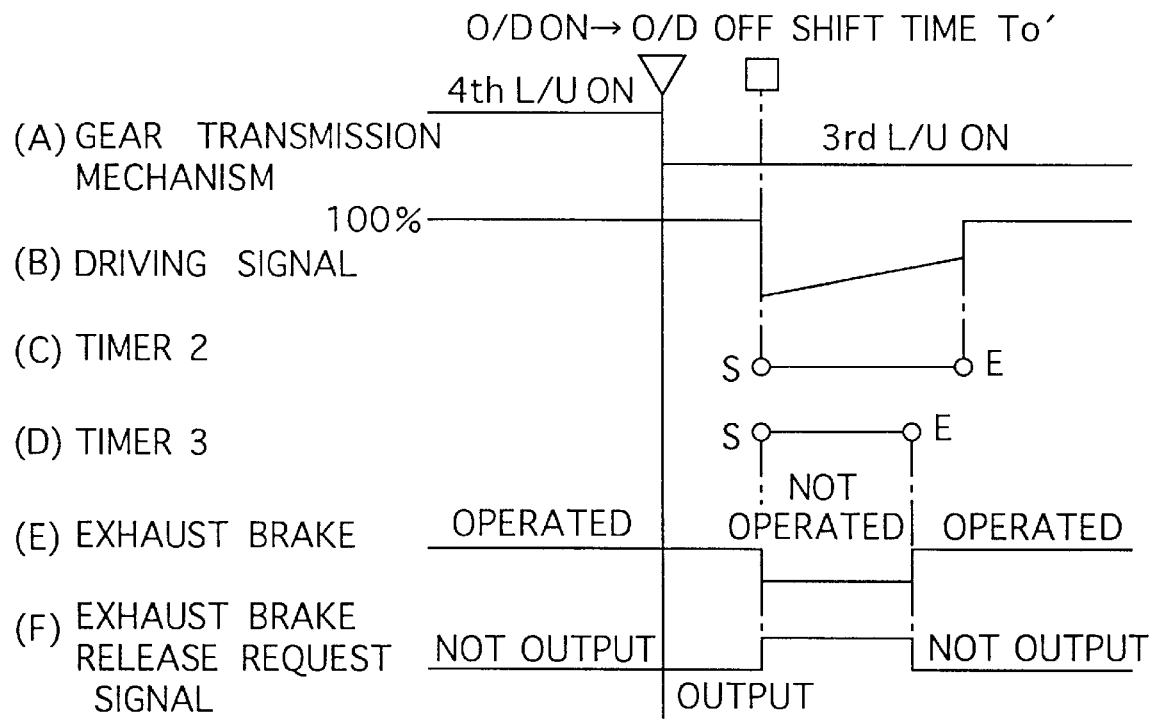
FIG. 4 is a time chart showing the operation of a Second Preferred Embodiment according to the present invention: (A) represents the operation of gear transmission mechanism; (B) the driving signal of lock-up solenoid; (C) the operation of timer 2; (D) the operation of timer 3; (E) the operation of the exhaust brake; (F) exhaust brake release request signal respectively.

In the Second Preferred Embodiment, as shown in FIG. 4 (A), during running in the coast condition at the over-drive range, for example, the down-shift is conducted to be three speed, and at that time, when the exhaust brake is operated, it is easy to engage the lock-up clutch.

The flow chart of this case is shown in FIG. 5: while S11 [down shift?] is not judged, the normal control of S18 is conducted; the down-shift is judged at S11 (refer to FIG. 4 $T^O$', after conducting the judgment of S12 [lock-up on?] so as to engage the lock-up clutch 3 and after judging that the exhaust brake is operated by the actual operation signal 21a at the succeeding S13 [exhaust brake acted], the program goes on to S13a [timer start]. At S13a, the stored timers 2 and 3, which are shown in FIG. 4(C) and 4(D), are started.

The above-mentioned timer 2 of S14 sets the period (in the case of current control, the period in which the current value is changed by stages) in which the duty ratio of the driving signal 20 transmitted to the lock-up solenoid 15 is changed in stages so as to relieve the shift operation shock caused by the above-mentioned down shift. Namely in general, at the time of shift operation, by releasing the engagement of the lock-up clutch 3 temporarily, the shift operation shock is excluded. However, in this Second Preferred Embodiment, in order to attain the two functions: which removes the above-mentioned shift operation shock and; which obtains the effective engine braking at the same time, without realizing temporarily the engagement of the lock-up clutch 3 completely, releasing the engagement of the lock-up clutch 3 only in a moment, after that, immediately, pressure is regulated so as to apply the modulator hydraulic pressure as the lock-up hydraulic pressure from the lock-up solenoid 15 to the lock-up clutch 3 in stages. Timer 2 defines the period in which this look-up hydraulic pressure is regulated in stages. In this case, when the driving signal 20 is PWM signal, it is possible to adopt the means which increase the duty ratio gradually in FIG. 4 (B). Actually, the treatment for varying the duty ratio is conducted in the following S17 [lock-up pressure control] ).

Next, in S15 [request to release the exhaust brake temporarily], the operation in which the duty ratio of the above-mentioned driving signal 20 is increased in stages is conducted in the period of releasing the exhaust brake. Namely, in order to conduct the engaging operation of the lock-up clutch 3 easily and in order to let the engine brake work securely, the temporary release request signal shown in FIG. 4 (F) is output; and as shown in FIG. 4 (E), the operation of the exhaust brake device 21 is temporarily released. The generating period of this temporary release request signal is set at S16 [end of timer 3 ?].

As mentioned above, in the Second Preferred Embodiment, the following two functions are attained at the same time: removing the shift operation shock at down-shift at the time of operating the exhaust brake; and affecting the engine brake effectively by conducting the engagement of the lock-up clutch easily.

Third Preferred Embodiment

As a Third Preferred Embodiment, without increasing the duty ratio of the driving signal 20 in stages after the reduction thereof; after disconnecting the driving signal 20 completely in the period of timer 2; at the time of end of the timer 2, even if the driving signal 20 is output, the shift operation shock remains a little; it is possible to engage the lock-up clutch easily.

Anyway, in the Third Preferred Embodiment, it is not necessary to define the device in which the exhaust brake is temporally released and it may be possible to maintain the state in which the exhaust brake is released.

Having now fully described the present invention, it will be apparent to one of ordinary skill in the art that many changes and modifications can be made thereto without departing from the spirit or scope of the present invention as set forth therein including the appended claims.

What is claimed is:

1. A control device of an automatic transmission provided with an exhaust brake device and a lock-up clutch which is adapted to directly connect an input side and an output side of a torque converter, comprising:

first detecting means for detecting whether an acceleration pedal is off during disengagement of the lock-up clutch;

second detecting means for detecting whether the exhaust brake device is operating;

release means for at least temporarily releasing the exhaust brake device when the first detecting means detects that the accelerator pedal is off during disengagement of the lock-up clutch and when the second detecting means detects that the exhaust brake device is operating to avoid difficulties associated with engagement of the lock-up clutch resulting from a rotational frequency at the output side of the torque converter being higher than at the input side of the torque converter; and means for engaging the lock-up clutch upon or after release of the exhaust brake device by the release means to directly connect the input side and the output side of the torque converter.

2. A control device according to claim 1, including a timer defining a time period during which the exhaust brake device is released.

3. A control device of an automatic transmission provided with an exhaust brake device and a lock-up clutch which is adapted to directly connect an input side and an output side of a torque converter and which is temporarily disengaged during shift, comprising:

first detecting means for detecting that a downshift of the automatic transmission is ongoing;

second detecting means for detecting whether the exhaust brake device is operating;

release means for at least temporarily releasing the exhaust brake device when the first detecting means detects that a downshift has occurred and when the second detecting means detects that the exhaust brake device is operating to avoid difficulties associated with engagement of the lock-up clutch resulting from a rotational frequency at the output side of the torque converter being higher than at the input side of the torque converter; and means for engaging the lock-up clutch upon or after release of the exhaust brake device by the release means to directly connect the input side and the output side of the torque converter.

4. A control device according to claim 3, wherein said means for engaging engages the lock-up clutch in stages.

5. A control device according to claim 4, including one timer defining a time period during which the means for engaging engages the lock-up clutch in stages.

6. A control device according to claim 5, including another timer defining a time period during which the exhaust brake device is released.

7. A control device according to claim 3 including a timer defining a time period during which the exhaust brake device is released.

8. A control device of an automatic transmission provided with an exhaust brake device and a lock-up clutch which is adapted to directly connect an input side and an output side of a torque converter and which is temporarily disengaged during shift, comprising:

first detecting means for detecting that a downshift of the automatic transmission is about to take place;

second detecting means for detecting whether the exhaust brake device is operating:

release means for at least temporarily releasing the exhaust brake device when the first detecting means detects that a downshift has occurred and when the second detecting means detects that the exhaust brake device is operating to avoid difficulties associated with engagement of the lock-up clutch resulting from a rotational frequency at the output side of the torque converter being higher than at the input side of the torque converter; and means for engaging the lock-up clutch upon or after release of the exhaust brake device by the release means to directly connect the input side and the output side of the torque converter.

9. A control device according to claim 8, wherein said means for engaging engages the lock-up clutch in stages.

10. A control device according to claim 8, including one timer defining a time period during which the means for engaging engages the lock-up clutch in stages.

11. A control device according to claim 10, including another timer defining a time period during which the exhaust brake device is released.

12. A control device according to claim 8, including a timer defining a time period during which the exhaust brake device is released.

* * * * *